(12) United States Patent
Nishio

(10) Patent No.: US 8,238,728 B2
(45) Date of Patent: Aug. 7, 2012

(54) RECORDING/REPRODUCING APPARATUS, RECORDING MEDIUM AND INTEGRATED CIRCUIT

(75) Inventor: Toshiroh Nishio, Osaka (JP)

(73) Assignee: Panasonic Corporation, Osaka (JP)

( * ) Notice: Subject to any disclaimer, the term of this patent is extended or adjusted under 35 U.S.C. 154(b) by 1300 days.

(21) Appl. No.: 11/914,510

(22) PCT Filed: May 25, 2006

(86) PCT No.: PCT/JP2006/310438
§ 371 (c)(1),
(2), (4) Date: Nov. 15, 2007

(87) PCT Pub. No.: WO2006/129546
PCT Pub. Date: Dec. 7, 2006

(65) Prior Publication Data
US 2009/0060463 A1    Mar. 5, 2009

(30) Foreign Application Priority Data

May 30, 2005    (JP) .................................. 2005-156786

(51) Int. Cl.
*H04N 5/93* (2006.01)
(52) U.S. Cl. ........................................ 386/353
(58) Field of Classification Search .................. 386/112, 386/353
See application file for complete search history.

(56) References Cited

U.S. PATENT DOCUMENTS

| | | | | |
|---|---|---|---|---|
| 5,335,299 | A * | 8/1994 | Atkinson | 382/244 |
| 6,269,215 | B1 * | 7/2001 | Okayama et al. | 386/302 |
| 6,792,043 | B1 * | 9/2004 | Takahashi et al. | 375/240.01 |
| 2003/0147012 | A1 * | 8/2003 | Hsiao et al. | 348/700 |
| 2006/0275022 | A1 * | 12/2006 | Perlman et al. | 386/112 |
| 2006/0275023 | A1 * | 12/2006 | Perlman et al. | 386/112 |

FOREIGN PATENT DOCUMENTS

| | | |
|---|---|---|
| JP | 9-261237 | 10/1997 |
| JP | 2003-099308 | 4/2003 |
| JP | 2004-194255 | 7/2004 |
| JP | 2005-79815 | 3/2005 |

OTHER PUBLICATIONS

International Search Report issued Aug. 29, 2006 in the International (PCT) Application of which the present application is the U.S. National Stage.

* cited by examiner

*Primary Examiner* — Kambiz Zand
*Assistant Examiner* — Teshome Hailu
(74) *Attorney, Agent, or Firm* — Wenderoth, Lind & Ponack, L.L.P.

(57) ABSTRACT

Provided is a recording/playback apparatus that externally acquires an uncompressed digital video signal. The recording/playback apparatus includes a compression unit compressing the uncompressed digital video signal frame-by-frame to generate compressed video data, and a record unit successively selecting, in accordance with a predetermined selection method for selecting which of the compressed video data and uncompressed video data of the uncompressed digital video signal to record, a piece of the compressed video data or the uncompressed video data, adding time information to a predetermined unit of the selected video data piece to indicate a display timing thereof, and recording the selected video data piece to the recording medium, whether the selected video data piece is compressed or uncompressed being identifiable.

7 Claims, 12 Drawing Sheets

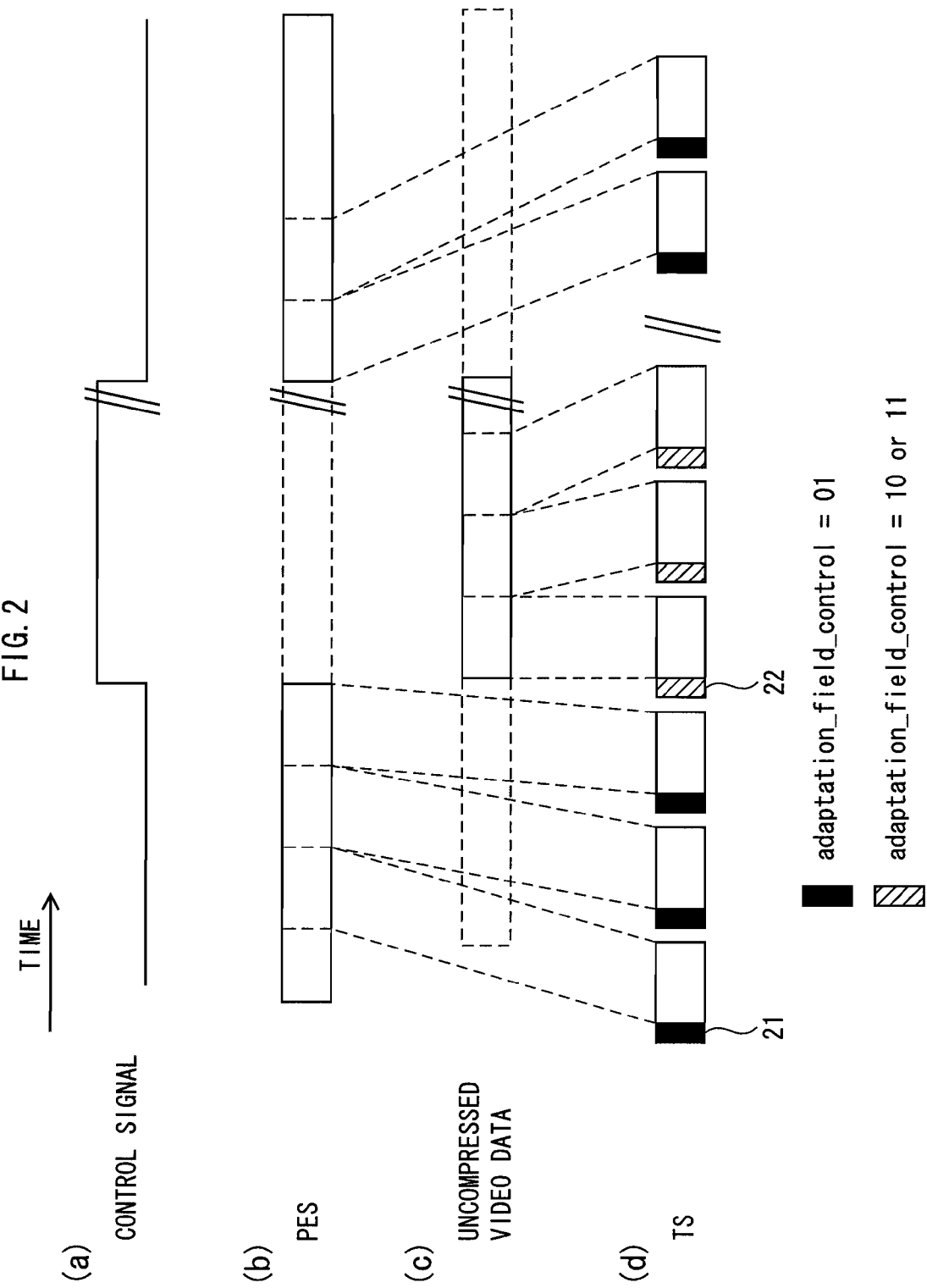

FIG. 3

STRUCTURE OF TRANSPORT STREAM PACKET

| Syntax | No. of Bits | Mnemonic |
|---|---|---|
| transport_packet() { | | |
|   sync_byte | 8 | bslbf |
|   transport_error_indicator | 1 | bslbf |
|   payload_unit_start_indicator | 1 | bslbf |
|   transport_priority | 1 | bslbf |
|   PID | 13 | uimsbf |
|   transport_scrambling_control | 2 | bslbf |
|   adaptation_field_control | 2 | bslbf |
|   continuity_counter | 4 | uimsbf |
|   if(adaptation_field_control=='10' \|\| adaptation_field_control=='11') { | | |
|     adaptation_field() | | |
|   } | | |
|   if(adaptation_field_control=='01' \|\| adaptation_field_control=='11') { | | |
|     for (i=0;i<N;i++) { | | |
|       data_byte | 8 | bslbf |
|     } | | |
|   } | | |
| } | | |

FIG. 4

STRUCTURE OF ADAPTATION FIELD

| Syntax | No. of Bits | Mnemonic |
|---|---|---|
| adaptation_field() { | | |
|   adaptation_field_length | 8 | uimsbf |
|   if(adaptation_field_length >0) { | | |
|     discontinuity_indicator | 1 | bslbf |
| (OMISSION) | | |
|     transport_private_data_flag | 1 | bslbf — 37 |
| (OMISSION) | | |
|     if(transport_private_data_flag =='1' { | | |
|       transport_private_data_length | 8 | uimsbf |
|       for (i=0; i<transport_private_data_length; i++) { | | |
|         Private_data_byte | 8 | bslbf — 38 |
|       } | | |
|     } | | |
| } | | |

FIG.5

| Syntax | No. of Bits | Mnemonic |
|---|---|---|
| PES_packet() { | | |
|   packet_start_code_prefix | 24 | bslbf |
|   stream_id | 8 | uimsbf |
|   PES_packet_length | 16 | uimsbf |
|   if(stream_id != program_stream_map | | |
|   && stream_id != padding_stream | | |
|   && stream_id != private_stream_2 | | |
|   && stream_id != ECM | | |
|   && stream_id != EMM | | |
|   && stream_id != program_stream_directory | | |
|   && stream_id != DSMCC_stream | | |
|   && stream_id != ITU-T Rec. H.222.1 type E_stream) { | | |
|     PTS_DTS_flags | 2 | bslbf | ← 41
|     if(PTS_DTS_flags =='10') { | | |
|       '0010' | 4 | bslbf | ⎫
|       PTS [32..30] | 3 | bslbf | ⎬ 42
|       marker_bit | 1 | bslbf | ⎪
|       PTS [29..15] | 15 | bslbf | ⎪
|       marker_bit | 1 | bslbf | ⎪
|       PTS [14..0] | 15 | bslbf | ⎪
|       marker_bit | 1 | bslbf | ⎭
|     } | | |

FIG. 7

BIT STRUCTURE

| Syntax | No. of Bits | Mnemonic |
|---|---|---|
| Non_encode_packet() { | | |
|   non_enc_start_code_prefix | 16 | bslbf |
|   '0010' | 4 | bslbf |
|   PTS [32..30] | 3 | bslbf |
|   marker_bit | 1 | bslbf |
|   PTS [29..15] | 15 | bslbf |
|   marker_bit | 1 | bslbf |
|   PTS [14..0] | 15 | bslbf |
|   marker_bit | 1 | bslbf |
|   for (i=0; i<N; i++) { | | |
|     for (j=0; j<M; j++) { | | |
|       Y[i,j] | 8 | bslbf |
|       Cb[i,j] | 8 | bslbf |
|       Cr[i,j] | 8 | bslbf |
|     } | | |
|   } | | |
| } | | |

RECORDING/REPRODUCING APPARATUS, RECORDING MEDIUM AND INTEGRATED CIRCUIT

TECHNICAL FIELD

The present invention relates to a recording/playback apparatus that compresses a digital video signal, records the compressed digital video signal, and plays back recorded video data, and in particular to technology for recording digital video signals when compression processing capacity is limited.

BACKGROUND ART

In recent years, there have been provided recording/playback apparatuses that receive video content such as a digitally broadcasted program, record the received video content to a recording medium such as a hard disk recorder, and play back the recorded video content. Before recording the video content, these recording/playback apparatuses perform encoding/compression processing on the video signals of the video content.

The encoding/compression of video signals is generally performed in accordance with the MPEG-2 system standard etc., and as the precision of the compression is raised, there is a large increase in the amount of operations that must be performed in predictive encoding processing for the compression, and more time is required for the encoding/compression processing. It is therefore necessary to maximize use of the processing capacity of the recording/playback apparatus when performing encoding/compression processing.

Also, patent document 1 discloses a recording method that enables saving digital signals not formatted according to the MPEG system, such as digital audio data that has been recorded on a CD (Compact Disc) etc., in an existing CD format compliant with MPEG system standards. This recording method involves collectively recording digital content, which is not formatted according to the MPEG system, in a transport stream format without performing compression processing.

Patent document 1: Japanese Patent Application Publication No. H09-261237

DISCLOSURE OF THE INVENTION

Problems Solved by the Invention

There are cases in which recording processing for two or more video contents is performed in parallel, such as a case in which a user request to dub video content is received while other video content is being encoded/compressed in accordance with MPEG-2 system standards and recorded.

In such a case, conventional recording/playback apparatuses either deny the request to record the video content until the recording processing pertaining to the recording request that was received first has ended, or reduce the amount of operations for compression processing. This is due to limitations on the compression processing capacity of conventional recording/playback apparatuses. While denying a request is an existing problem, the case of accepting the request and performing compression and recording also generally has the resulting problem of a reduction in image quality during playback.

An object of the present invention is to provide a recording/playback apparatus that, even if a plurality of recording requests for video content are received from a user, accepts all of the video content recording requests from the user, maximizes compression of each of the video contents while preventing degradation in image quality, records the compressed video data, and plays back the recorded video data.

Means to Solve the Problems

In order to solve the above problems, the present invention is a recording apparatus that receives an uncompressed digital video signal and records video data to a recording medium with use of the received uncompressed digital video signal, including: a compression unit operable to compress the uncompressed digital video signal frame-by-frame to generate compressed video data; and a record unit operable to, in accordance with a predetermined selection method for selecting which of the compressed video data and uncompressed video data of the uncompressed digital video signal to record, successively select a piece of the compressed video data or the uncompressed video data, add time information to a predetermined unit of the selected video data piece to indicate a display timing thereof, and record the selected video data piece to the recording medium, whether the selected video data piece is compressed or uncompressed being identifiable.

Also, the present invention is a playback apparatus that plays back video data which has been recorded to a recording medium by the recording apparatus, the playback apparatus including: a judgment unit operable to read a piece of the video data, the video data piece being of a predetermined size, and judge whether the read video data piece is compressed or uncompressed; a first extraction unit operable to, if the judgment unit has judged that the video data is compressed, decode the video data piece and extract time information that has been added to the decoded video data piece; a second extraction unit operable to, if the judgment unit has judged that the video data piece is uncompressed, extract time information that has been added to the video data piece; and an output unit operable to output the decoded video data piece in accordance with a timing indicated by the time information extracted by the first extraction unit, and output the video data piece judged to be uncompressed in accordance with a timing indicated by the time information extracted by the second extraction unit.

Also, the present invention is a recording medium having video content recorded thereon, wherein a frame of the video content includes one of compressed video data and time information indicating a display timing of the compressed video data, and uncompressed video data and time information indicating a display timing of the uncompressed video data, and which of the compressed video data and the uncompressed video data the frame of the video content includes is identifiable.

Effects of the Invention

According to this structure, each recorded predetermined unit of the compressed video data and uncompressed video data includes time information that indicates a display timing of the video data piece, thereby enabling the selected video data pieces to be recorded sequentially with respect to a time axis, regardless of whether compressed or uncompressed video data pieces are selected. Consequently, when playing back the recorded video data, the video content expressed by the received digital video signals can be played back by displaying images expressed by the video data pieces according to the timing information included therein.

Also, if the predetermined selection method is a selection method that, for example, maintains the predetermined reference image quality, video content can be compressed to the greatest extent possible while preventing degradation in the image quality of the video content.

Furthermore, given that the predetermined units of video data are recorded to the recording medium by the record unit so as to be identifiable as either compressed or uncompressed video data, the video data can be decoded and played back depending on whether it is compressed or uncompressed video data.

Accordingly, even in an exemplary case in which a request to compress and record a video content is received while another video content is being compressed and recorded, and furthermore the compression processing capacity is exceeded, the video content for which the request was received can be recorded as uncompressed video data until the other compression and recording processing has been completed, and then recorded as compressed video data after the other compression and recording processing has ended. This enables the user request to be executed, as well as compressing video content to the greatest extent possible in order to reduce the data size thereof.

Also, the recording apparatus may further include a judgment unit operable to, with use of the compressed video data and the uncompressed video data, judge frame-by-frame whether the compression unit has performed the compression such that an image quality of the compressed video data is greater than or equal to a predetermined reference image quality, wherein the predetermined selection method is a method for selecting to record a piece of the compressed video data if the judgment unit judges affirmatively, and a piece of the uncompressed video data if the judgment unit judges negatively, and the record unit selects the piece of the compressed video data or the uncompressed video data, adds time information to the predetermined unit of the selected video data piece to indicate the display timing thereof, and records the selected video data piece to the recording medium in a transport stream format, whether the selected video data piece is compressed or uncompressed being identifiable.

According to this structure, if the judgment unit judges that the image quality of the compressed video data is less than the predetermined reference image quality, time information is added into the uncompressed video data, which is then recorded. Therefore, in an exemplary case in which two or more instances of compression/recording processing are being executed in parallel and the compression rate is lowered to reduce the load of operations required for compression, uncompressed video data is recorded if the image quality of the compressed video data is below the predetermined reference image quality. This enables the recording of video data whose image quality is greater than or equal to the predetermined reference image quality.

Also, the judgment unit may perform the judgment by decoding the compressed video data frame-by-frame to generate decoded video data, calculating differences between pixel values of the decoded video data and corresponding pixel values of the uncompressed video data, judging that the image quality of the decoded video data is greater than or equal to the predetermined reference image quality if a total of the calculated differences is greater than or equal to a predetermined threshold, and judging that the image quality of the decoded video data is less than the predetermined reference image quality if the total of the calculated differences is less than the predetermined threshold.

According to this structure, the judgment unit judges whether the image quality of the compressed video data is greater than or equal to the predetermined reference image quality by decoding the compressed video data and comparing the pixel values of a frame of the decoded video data with corresponding pixel values of the uncompressed video data. This enables judging the image quality of all frames if two or more compression/recording requests are received and the compression rate is lowered, and easily judging frame-by-frame whether compression performance has deteriorated.

Also, the record unit may further be operable to set an adaptation field control value such that whether the selected video data piece is compressed or uncompressed is identifiable, and the record unit may record the selected video data piece to the recording medium as a transport stream packet, the transport stream packet not including an adaptation field if the selected video data piece is compressed, and the selected video data piece being stored in an adaptation field of the transport stream packet if the selected video data piece is uncompressed.

According to this structure, the judgment regarding compressed and uncompressed video data is performed according to an adaptation field control value prescribed in the MPEG-2 standard, and the ability to store uncompressed video data in the adaptation field makes it possible to perform recording according to the existing MPEG-2 standard without providing new definitions for storing the uncompressed video data in transport packets.

Also, the recording apparatus may further include a re-compression/record control unit operable to read a piece of the video data that has been recorded to the recording medium, judge whether the read video data piece is compressed or uncompressed, and if the read video data piece is judged to be uncompressed, cause the compression unit to compress the read video data piece to generate a new compressed video data piece, and cause the record unit to add the time information of the read video data piece to the new compressed video data piece and record the new compressed video data piece to the recording medium in place of the read video data piece judged to be uncompressed.

According to this structure, even when both compressed and uncompressed video data is recorded together on the recording medium, nighttime or another period when two or more recording processing instances do not readily occur may be used to read the uncompressed video data, perform compression thereof, and record the resulting compressed video data in place of the uncompressed video data. This enables reducing the size of the video data recorded on the recording medium, thereby freeing up storage area.

BRIEF DESCRIPTION OF THE DRAWINGS

FIG. 2 shows a relationship between a control signal and a transport stream;

FIG. 3 shows a structure of a transport stream packet;

FIG. 4 shows a structure of an adaptation field;

FIG. 5 shows a structure of a PES packet;

FIG. 7 shows a bit structure of uncompressed video data;

DESCRIPTION OF THE CHARACTERS

Figure 1:
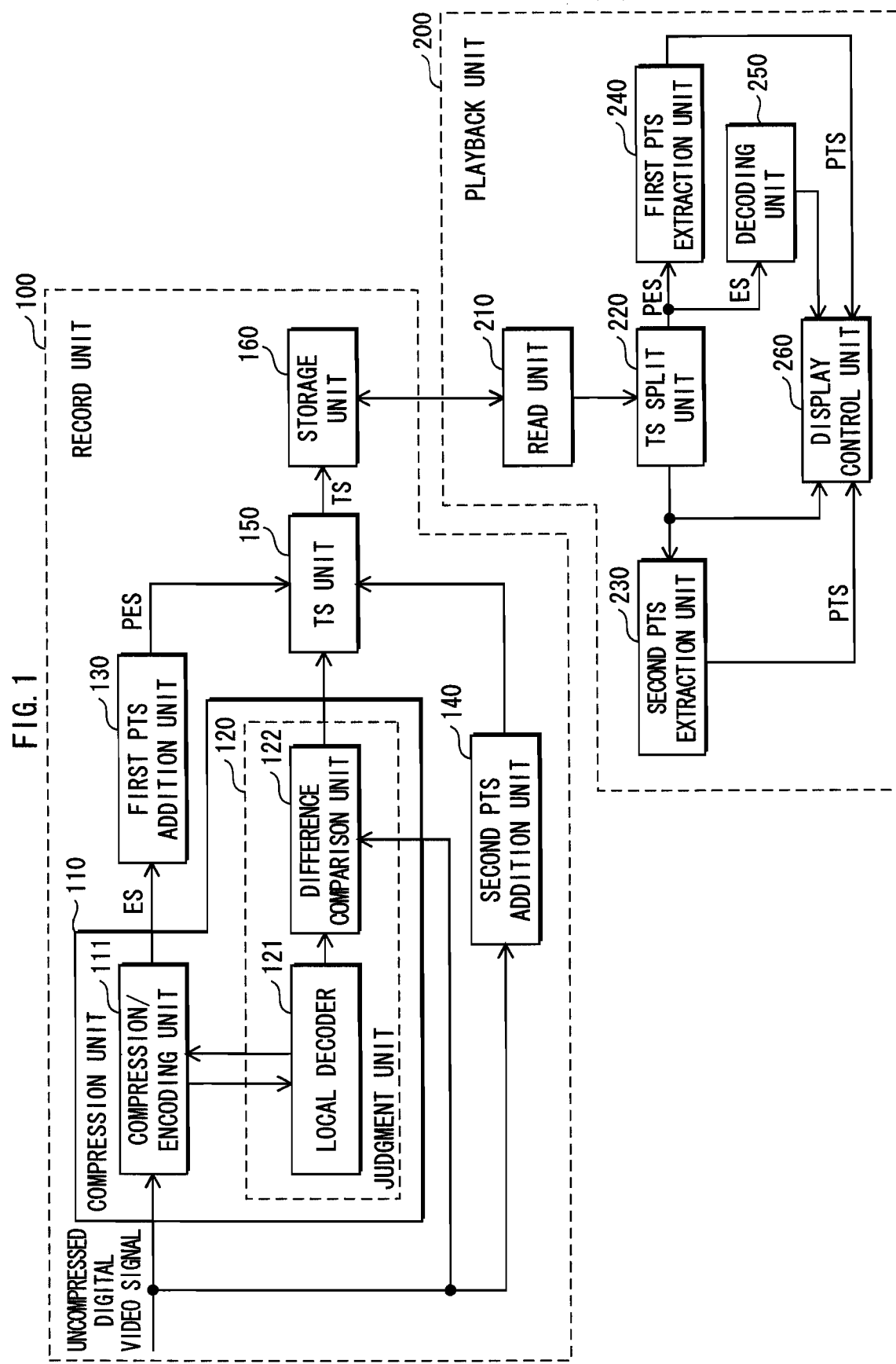
FIG. 1 is a functional block diagram of a recording/playback apparatus pertaining to embodiment 1.

- 100, 101 record unit
- 110 compression unit
- 111 compression/encoding unit
- 120 judgment unit
- 121 local decoder
- 122 difference comparison unit
- 130 first PTS addition unit
- 140 second PTS addition unit
- 150 TS unit
- 160 storage unit
- 170 switch unit
- 200, 201 playback unit
- 210, 211 read unit
- 212 header analysis unit
- 220 TS split unit
- 230 second PTS extraction unit
- 240 first PTS extraction unit
- 250 decoding unit
- 260 display control unit

BEST MODE FOR CARRYING OUT THE INVENTION

Embodiment 1

Overview

A recording/playback apparatus pertaining to the present invention is compliant with MPEG-2 system standards. If two or more compression processes are being performed in parallel (e.g., dubbing processing is being performed on a video content while uncompressed digital video content such as a TV broadcast program is being compressed and recorded), and if furthermore the limit of compression processing capacity is exceeded, the recording/playback apparatus performs compression with a lower image quality by, for example, lowering the compression rate so as to reduce the processing load of compression-related operations.

In the above case, if compression processing is being performed within the limit of compression processing capacity, the recording/playback apparatus of the present invention adds time information, which indicates display timings, to the video data that has been compressed (hereinafter, referred to as "compressed video data"), and records the compressed video data to a recording medium as transport stream (TS) packets. If a compression/recording request is received, the limit of compression processing capacity will be exceeded, and compression processing would result in an image quality that is below a predetermined reference image quality, the recording/playback apparatus adds time information to the uncompressed video data based on the uncompressed digital video signal, and records the uncompressed video data to the recording medium in a TS packet format.

Note that whether the image quality is below the predetermined reference image quality is judged by comparing, frame by frame, the uncompressed video data and decoded compressed video data, and judging whether the compressed image quality of each frame is greater than or equal to the predetermined reference image quality. The recording/playback apparatus records either the compressed video data or the uncompressed video to the recording medium according to a control signal that indicates a result of the judgment.

The following describes the aforementioned recording processing with reference to FIG. 2.

FIG. 2(*a*) shows an exemplary control signal that indicates whether compressed image quality is greater than or equal to the predetermined reference image quality, where a section of control signal in which the signal level is low indicates that the compressed image quality is at least the predetermined reference image quality, and a section of the control signal in which the signal level is high indicates that the compressed image quality is below the predetermined reference image quality.

FIG. 2(*b*) shows PES packets formed frame-by-frame from a bit stream composed of a compressed digital video signal, and FIG. 2(*c*) shows video data based on an uncompressed digital video signal.

Also, FIG. 2(*d*) shows video data that has been selectively formed into TS packets according to the level of the control signal shown in FIG. 2(*a*). As shown in FIG. 2, during low sections of the control signal, the PES packets including compressed video data are formed into TS packets and recorded, and during high sections of the control signal, the uncompressed video data is formed into TS packets and recorded, thereby enabling the digital video content to be recorded as a single TS.

Note that in the present embodiment, adaptation field control for TS packets is used to identify whether each piece of the video data recorded to the recording medium is compressed or uncompressed video data. In the case of uncompressed video data, adaptation field control values have been set to "01", and the TS packets have been formed without an adaptation field. In the case of compressed video data, the adaptation field control values have been set to "10" or "11", and the TS packets have been formed so as to include an adaptation field.

Also, when playing back a TS that includes compressed and uncompressed video data, each TS packet is judged to include compressed or uncompressed video data according to the adaptation field value included therein, and playback of each piece of video data is performed according to a timing indicated by the time information included therein.

Structure

The following describes a structure of the aforementioned recording/playback apparatus of the present invention with reference to FIG. 1.

FIG. 1 shows a functional structure of the recording/playback apparatus of the present embodiment. Here, the recording/playback apparatus includes a record unit 100 and a playback unit 200.

Record Unit 100

The record unit 100 includes a compression unit 110, a first PTS addition unit 130, a second PTS addition unit 140, a TS unit 150, and a storage unit 160.

The following describes the above units.

The compression unit 110 includes a compression/encoding unit 111 and a judgment unit 120.

Here, the compression/encoding unit 111 acquires an uncompressed digital video signal, performs compression by encoding the digital video signal frame-by-frame at a predetermined compression rate with use of interframe information, and outputs the compressed data, which has a minimal difference from decoded data generated by a local decoder 121, to the first PTS addition unit 130. Note that the video signal is compressed at a lower rate than the normal compression rate if a recording request that will cause the compression processing capacity limit to be exceeded is received, such as a case in which two or more video content recording requests have been received.

Note that in the present embodiment, even in the case of a single compression/recording processing request, a judgment unit 120, which is described later, judges whether the image quality of the compressed video data is greater than or equal to the predetermined reference image quality, and compressed video data whose image quality is greater than or equal to the predetermined reference image quality is output to the first PTS addition unit 130. Also, when compressing frames based on the uncompressed digital video signal, the encoding/compression of each frame is performed based on the uncompressed video data of that frame and the video data of an immediately preceding frame that has been decoded by the local decoder 121.

The judgment unit 120 includes the local decoder 121 and a difference comparison unit 122. The judgment unit 120 judges whether compression that at least maintains the predetermined reference image quality has been performed.

The following describes the units included in the judgment unit 120.

The local decoder 121 decodes compressed video data, and outputs the decoded video data to the compression/encoding unit 111 and the difference comparison unit 122.

Also, the difference comparison unit 122 calculates a difference between the pixel values of one frame-worth of decoded video data and the uncompressed video data corresponding thereto, judges whether the calculated difference total is greater than or equal to a threshold, outputs a low level control signal to the TS unit 150 if the judgment is affirmative, and outputs a high level control signal to the TS unit 150 if the judgment is negative.

The first PTS addition unit 130 adds presentation time stamps (hereinafter, referred to as "PTS") to the compressed video data, converts the compressed video data to PES packets, and outputs the PES packets to the TS unit 150. Each PTS indicates a display timing of a corresponding frame.

The second PTS addition unit 140 acquires the uncompressed digital video signal, adds PTSs frame-by-frame, and outputs video data indicating the pixel values of frames to the TS unit 150.

The TS unit 150 acquires the control signal, the uncompressed video data, and the PES packets that include the compressed video data, selects either a PES packet or the uncompressed video data according to the signal level of the control signal, converts the selected video data to TS packets, and stores the TS packets in the storage unit 160 as a single TS.

Note that during the TS packet generation processing, if a PES packet (i.e., compressed video data) is selected, the TS unit 150 sets the adaptation field control value to "01", and inserts the selected PES packet into the payload of a TS packet having the same PID, such that the TS packet does not include an adaptation field. Also, if the uncompressed video data is selected, the TS unit 150 sets the adaptation field control value to "10" or "11", and inserts a predetermined amount of the uncompressed video data into the adaptation field of a TS packet having the same PID.

The storage unit 160 is realized by a recording medium such as a hard disk. The storage unit 160 acquires the TS packets output by the TS unit 150, adds an Arrival Time Stamp (ATS) to each of the received TS packets, and stores the TS packets. An ATS indicates an arrival timing of a TS packet.

Playback Unit 200

The playback unit 200 includes a read unit 210, a TS split unit 220, a first PTS extraction unit 240, a decoding unit 250, a second PTS extraction unit 230, and a display control unit 260.

The following describes the above units.

The read unit 210 reads the TS stored in the storage unit 160, based on ATSs added to the TS packets.

The TS split unit 220 receives the TS packets of the read TS stream, and in accordance with the adaptation field control values of the TS packet headers, outputs PES packets to the first PTS extraction unit 240, and outputs elementary streams (ES) stored in the PES packets (i.e., the compressed video data) to the decoding unit 250. Also, in accordance with the adaptation field control values, the TS split unit 220 outputs data stored in the adaptation fields to the second PTS extraction unit 230, and outputs the uncompressed video data stored in the adaptation fields to the display control unit 260.

The first PTS extraction unit 240 extracts PTSs from the headers of received PES packets, and outputs the extracted PTSs to the display control unit 260.

The decoding unit 250 acquires the compressed video data, decodes the compressed video data, and outputs the decoded video data to the display control unit 260.

Also, the second PTS extraction unit 230 acquires data stored in adaptation fields, extracts PTSs from the acquired data, and outputs the extracted PTSs to the display control unit 260.

The display control unit 260 acquires the decoded video data, the uncompressed video data, and the PTSs corresponding thereto, and causes a display to display the video data according to timings indicated by the PTSs.

Data

The following describes data stored in the storage unit 160 of the recording/playback apparatus pertaining to the present embodiment.

Structure of a TS Packet

FIG. 3(a) shows a data structure of a standard TS packet that has been generated by the TS unit 150.

A Syntax 31 shows a structure of a bit stream that includes compressed video data, and a No. of Bits 32 shows the number of bits in the structures shown by Syntax 31.

As shown in FIG. 3, an adaptation_field_control field 33 indicates whether an adaptation field is included. As shown by 34 and 35 of FIG. 3, if the value of the adaptation_field_control field 33 is "10" or "11", the corresponding TS packet includes an adaptation field, and if the value of the adaptation field_control field 33 is "10" or "11", the TS packet includes only PES packet data bytes, or PES packet data bytes and an adaptation field.

In the present embodiment, the value of the adaptation_field_control field 33 is set to "01" if the TS packet includes compressed video data, and to "10" if the TS packet includes uncompressed video data.

A data_byte field 36 indicates that the TS packet includes PES packet data which is described later.

Structure of an Adaptation Field

FIG. 4 shows a structure of an adaptation field.

A transport_private_data_flag 37 is a field that indicates whether the adaptation field includes a transport_private_data_byte, which is set to "1" if uncompressed video data is stored in private data.

Also, a private_data_byte 38 is a user data field that stores a frame of uncompressed video data. The uncompressed video data is stored in 8-bit pieces so as to not exceed 184 bytes, excluding the header of the TS packet.

Structure of a PES Packet

Figure 6:
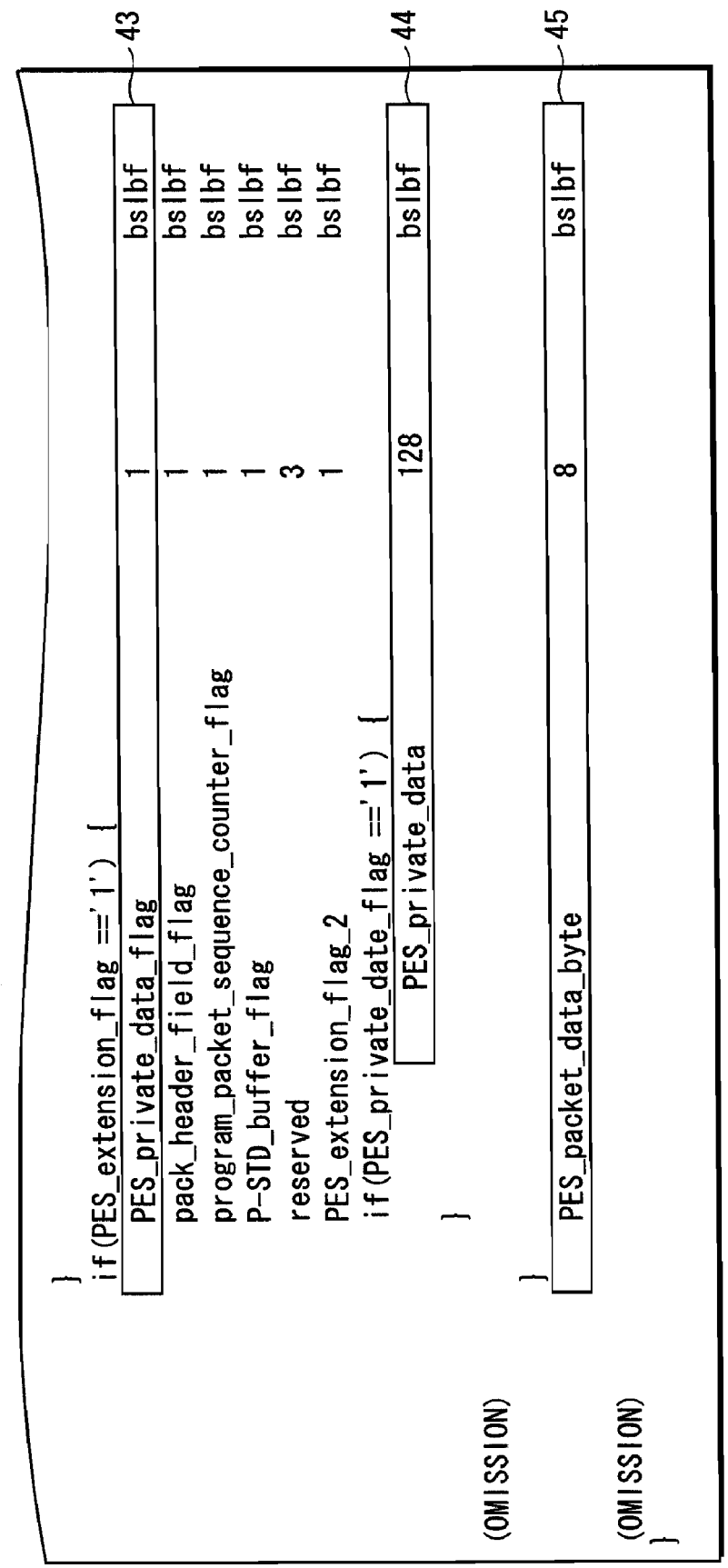
FIG. 6 shows the structure of the PES packet.

FIGS. 5 and 6 show a structure of a standard PES packet storing compressed video data. The following describes fields that are characteristic to the present invention.

A PTS_DTS_flags 41 indicates whether the PES packet includes a PTS field. As shown in FIG. 5, PTS_DTS_flags 41 is set to "10" if the PES packet includes a PTS field.

A PTS field 42 stores time information that indicates a timing according to which video data in the PES packet is to be displayed. In the present embodiment, PTSs are assigned in the format shown by PTS fields 42 shown in FIG. 5.

A PES_private_data_flag 43 is a field that indicates whether the PES packet includes a PES_private_data field. PES_private_flag 43 is set to "1" if the PES packet includes a PES_private_data field. A PES_private_data field 44 is a 128-bit field that stores user data.

A PES_packet_data_byte 45 is a field that stores compressed video data. The compressed video data is stored in 8-bit pieces so as to not exceed 184 bytes, excluding the TS header of the TS packet.

Bit Structure of Uncompressed Video Data

FIG. 7 shows an exemplary bit structure of uncompressed video data that is stored in private_data_byte. In the present embodiment, each packet including uncompressed video data is called a Non_encode_packet 51, and a structure thereof is defined again below.

Here, a non_enc_start_code_prefix 52 is a field that indicates a start code of the uncompressed video data packet. In the present embodiment, non_enc_start_code prefix 52 is expressed by 16 bits.

A PTS field 53 indicates PTSs for the uncompressed video data stored in Non_encode_packet 51. As shown in FIG. 7, PTSs are set according to the same format as the PTSs of the aforementioned PES packet.

Also, as shown by 54 in FIG. 7, uncompressed video data fields are defined after the PTS field 53.

Figure 8:
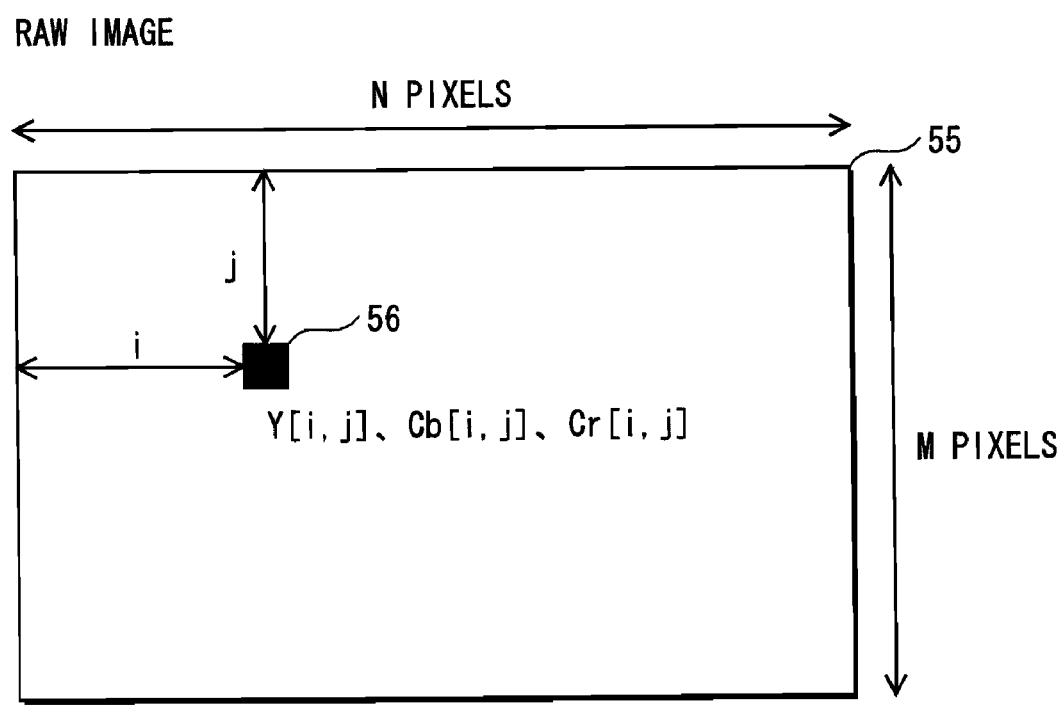
FIG. 8 shows a luminance signal and a color-difference signal of pixels in a raw image.

Here, N shown in 54 of FIG. 7 indicates the number of horizontal pixels in a raw image 55 shown in FIG. 8, and M indicates the number of vertical pixels in the raw image 55. In FIG. 8, Y[i,j], Cb[i,j] and Cr[i,j] indicate a luminance signal and a color difference signal for a pixel 56 in the raw image 55. The uncompressed video data fields for storing luminance signals and color difference signals for each pixel of an image are inserted after the PTS field 53.

Accordingly, the packets storing the luminance signals and color difference signals shown in FIG. 7 are inserted sequentially after the PTS field 53 in private_data_byte 38 (FIG. 3b) of the adaptation field. Note that the total size of the packets is specified by a transport_private_data_length field of the adaptation field shown in FIG. 4.

Operations

The following describes operations of the recording/playback apparatus pertaining to the present embodiment.

Recording Processing

Figure 9:
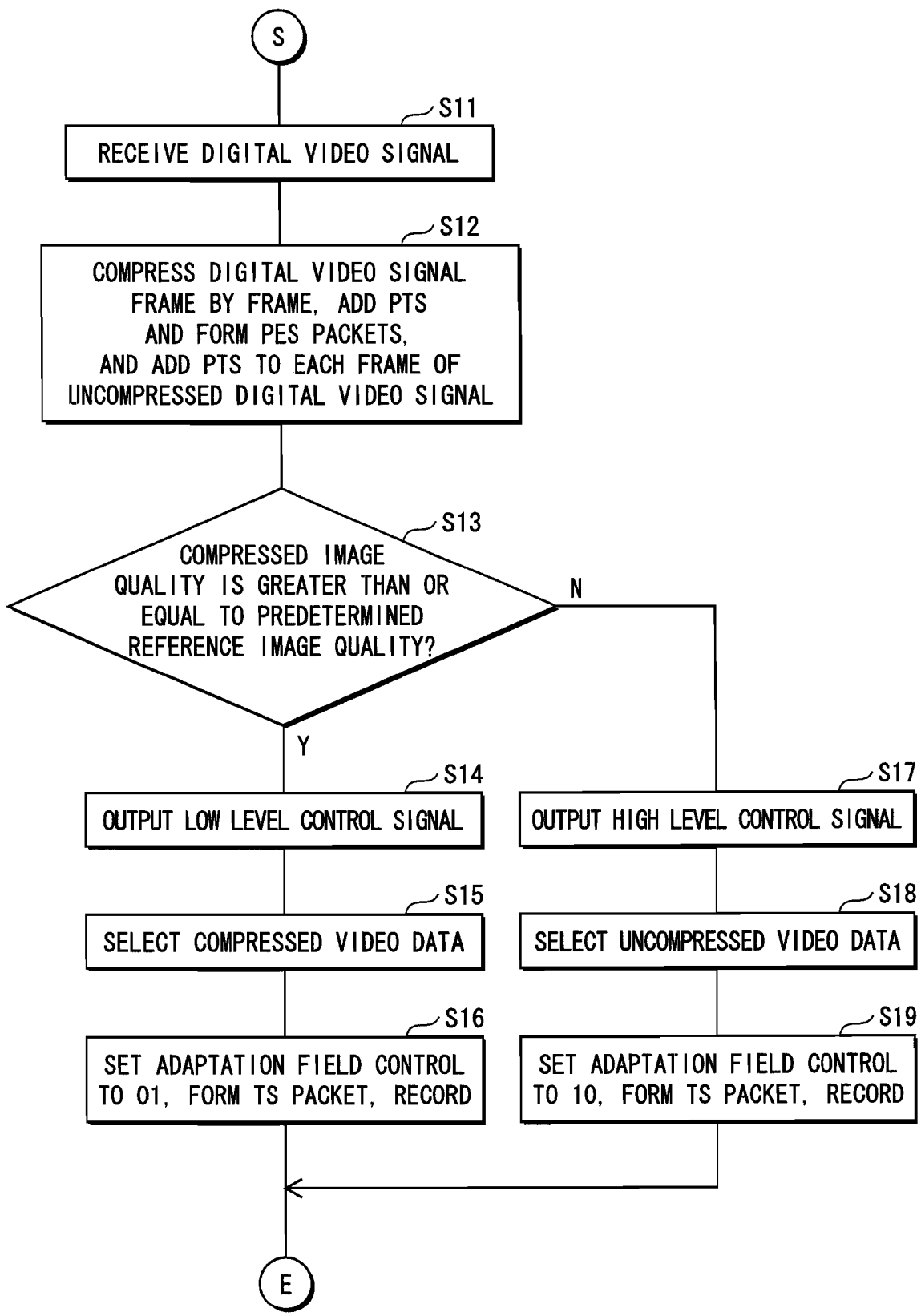
FIG. 9 is a flowchart showing recording processing performed by a record unit pertaining to embodiment 1.

FIG. 9 is a flowchart showing recording processing performed by the recording/playback apparatus of the present embodiment. The following describes the recording processing with reference to FIG. 9.

The compression/encoding unit 111, the difference comparison unit 122 and the second PTS addition unit 140 receive the uncompressed digital video signal. Also, the compression/encoding unit 111 compresses the received digital video signal frame by frame, and outputs the compressed video data to the first PTS addition unit 130 and the local decoder 121 (step S11).

The first PTS addition unit 130 adds a PTS to each frame of the compressed video data received in step S11, converts the compressed video data to PES packets (FIG. 4), and outputs the PES packets to the TS unit 150. Also, in accordance with the bit structure of the Non_encode_packet shown in FIG. 5, the second PTS addition unit 140 sets the packet start code of the uncompressed video data, sets the PTS of each frame of the uncompressed video data, and outputs packets including the luminance signals and color difference signals of each frame to the TS unit 150 (step S12).

Thereafter, the local decoder 121 decodes the compressed video data received from the compression/encoding unit 111, and outputs the decoded video data to the difference comparison unit 122.

The difference comparison unit 122 calculates a difference between the decoded video data generated by the local decoder 121 and the uncompressed video data received in step S11 by comparing corresponding pixel values thereof, and judges frame by frame whether a total difference is greater than or equal to a threshold (step S13).

If the difference comparison unit 122 judges in step S13 that the difference is not greater than or equal to the threshold, that is to say, if it is judged that the image quality of the compressed frame is greater than or equal to the predetermined reference image quality (step S13:Y), the difference comparison unit 122 outputs a low level control signal to the TS unit 150 (step S14).

Upon receiving the low level control signal from the difference comparison unit 122, the TS unit 150 selects, from between the video data received from the first and second PTS addition unit 130 and 140 in step S12, a PES packet including compressed video data, which was received from the first PTS addition unit 130 (step S15).

In accordance with the TS packet structure shown in FIG. 3, the TS unit 150 sets adaptation_field_control 33 of a TS header for a TS packet to "01", inserts the PES packet selected in step S15 into data_byte 36 of the TS packet to generate a TS packet, and stores the generated TS packet in the storage unit 160 (step S16).

Also, if the difference comparison unit 122 judges in step S13 that the difference is greater than or equal to the threshold, that is to say, if it is judged that the image quality of the compressed frame is below the predetermined reference image quality (step S13:N), the difference comparison unit 122 outputs a high level control signal to the TS unit 150 (step S17).

Upon receiving the high level control signal from the difference comparison unit 122, the TS unit 150 selects, from between the video data received from the first and second PTS addition unit 130 and 140 in step S12, the Non_encode_packet including the uncompressed video data (step S18).

In accordance with the TS packet structure shown in FIG. 3, the TS unit 150 sets adaptation_field_control 33 of a TS header for a TS packet to "10", inserts the Non_encode_packet (FIG. 4) selected in step S18 into private_data_byte field 38 (FIG. 4) of the adaptation field to generate a TS packet, and stores the TS packet in the storage unit 160 (step S19).

According to the above recording processing, if dubbing processing etc. is to be performed on video content while compression processing is being performed on other video content, there would be a resulting deterioration in compression processing performance (e.g., compression would be performed with a reduced image quality), and in this case, the video data that has already been compressed is recorded as TS packets, and uncompressed video data is recorded as TS packets with PTSs added thereto while the compression processing performed has deteriorated. This enables maintaining a predetermined image quality for recorded video data and recording compressed and uncompressed video data as a TS, thereby making it possible to play back video having uniform image quality.

The following describes playback operations performed by the recording/playback apparatus of the present embodiment.

Playback Operations

Figure 10:
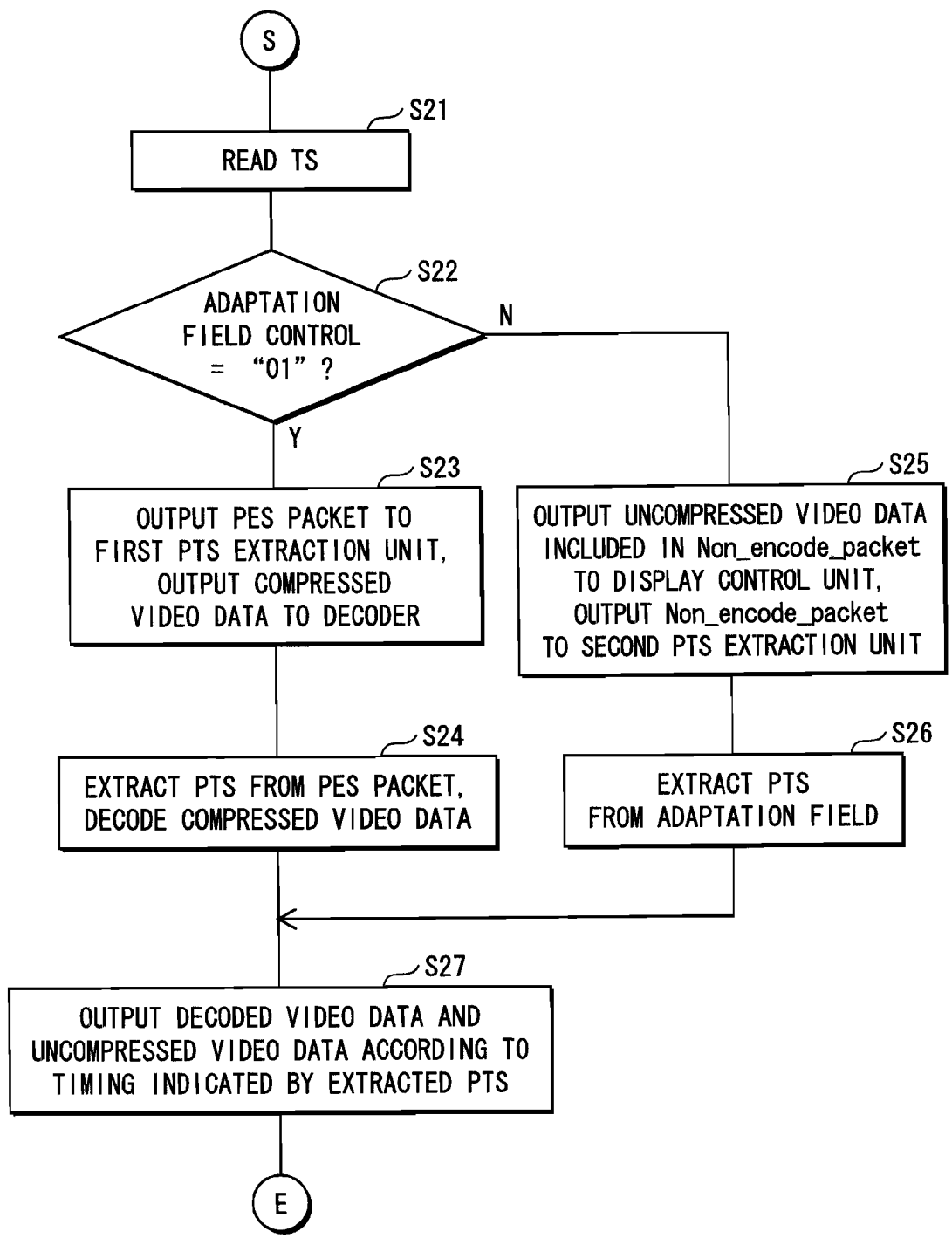
FIG. 10 is a flowchart showing playback processing performed by a playback unit pertaining to embodiment 1.

FIG. 10 is a flowchart showing playback processing performed by the recording/playback apparatus of the present embodiment. The following describes the playback processing with reference to FIG. 10.

In step S21, the read unit 210 reads the video data TS recorded to the storage unit 160 by the record unit 100, and outputs the read TS to the TS split unit 220.

Upon receiving the TS from the read unit 210, the TS split unit 220 judges, for each TS packet, whether adaptation_field_control 33 (FIG. 3) of the TS header is set to "01" (step S22).

If adaptation_field_control 33 is judged in step S22 to be set to "01" (step S22:Y), the TS split unit 220 outputs the PES packet (FIGS. 5 and 6) included in the TS packet to the first PTS extraction unit 240, and outputs the compressed video data (ES) included in PES_packet_data_byte 45 (FIG. 6) of the PES packet indicated by packet_start_code_prefix to the decoding unit 250 (step S23).

Thereafter, the first PTS extraction unit 240 extracts the PTSs stored in PTS fields 42 (FIG. 5) of the PES packet received from the TS split unit 220, and outputs the extracted PTSs to the display control unit 260. Also, upon receiving the compressed video data (ES) from the TS split unit 220, the decoding unit 250 decodes the received compressed video data, and outputs the decoded video data to the display control unit 260 (step S24).

Also, if adaptation_field_control 33 is judged in step S22 to not be set to "01" (step S22:N), the TS split unit 220 reads the packet start code of the uncompressed video data from non_enc_start_code_prefix 51 of the Non_encode_packet (FIG. 7) inserted into private_data_byte 38 (FIG. 4) of the adaptation field of the TS packet, and successively outputs the luminance signals and color difference signals of the uncompressed video data packet to the display control unit 260. The TS split unit 220 also outputs the data stored in the Non_encode_packet to the second PTS extraction unit 230 (step S25).

Thereafter, the second PTS extraction unit 230 receives the data of the Non_encode_packet from the TS split unit 220, extracts the PTSs stored in the PTS fields, and outputs the extracted PTSs to the display control unit 260 (step S26).

The display control unit 260 receives the PTSs extracted by the first PTS extraction unit 240 in step S24 and the video data decoded by the decoding unit 250, or the luminance signals and color difference signals of the uncompressed video data that were output from the TS split unit 220 in step S25 and the PTSs extracted by second PTS extraction unit 230 in step S26, and causes a display or the like to display the received video data according to the timings indicated by the extracted PTSs (step S27).

Embodiment 2

It is described in the above embodiment 1 that uncompressed video data is formed into TS packets and recorded if compression processing performance has deteriorated, and that a TS including compressed and uncompressed video data is played back.

In the present embodiment, when compression processing performance has deteriorated, a TS that includes compressed and uncompressed video data is generated and stored in the storage unit 160 as in embodiment 1, and additionally, after recording has been performed, a period during which there is a small processing load on the record unit (e.g., during the night, when a plurality of compression/recording processes are not being performed in parallel) is used to read the recorded TS that includes uncompressed video data, compress the uncompressed video data, and re-record the resulting compressed video data in place of the uncompressed video data.

Note that in the present embodiment, the mechanism for reading the recorded TS and outputting the uncompressed video data to the record unit is assumed to be provided in the playback unit described in embodiment 1. However, the mechanism may be provided in the record unit.

Also, an instruction pertaining to selection of the read TS and the timing of the reading (hereinafter, referred to as a "re-recording instruction") is output by a microcontroller etc. that is external to the recording/playback apparatus. The microcontroller etc. is assumed to store an identifier of the TS that includes TS packets containing uncompressed video data recorded by the recording/playback apparatus, and to specify the TS identifier in the re-recording instruction. Note that a description of control performed by the microcontroller etc. has been omitted since it is not a characteristic portion of the present invention.

The following describes the recording/playback apparatus pertaining to the present embodiment.

Figure 11:
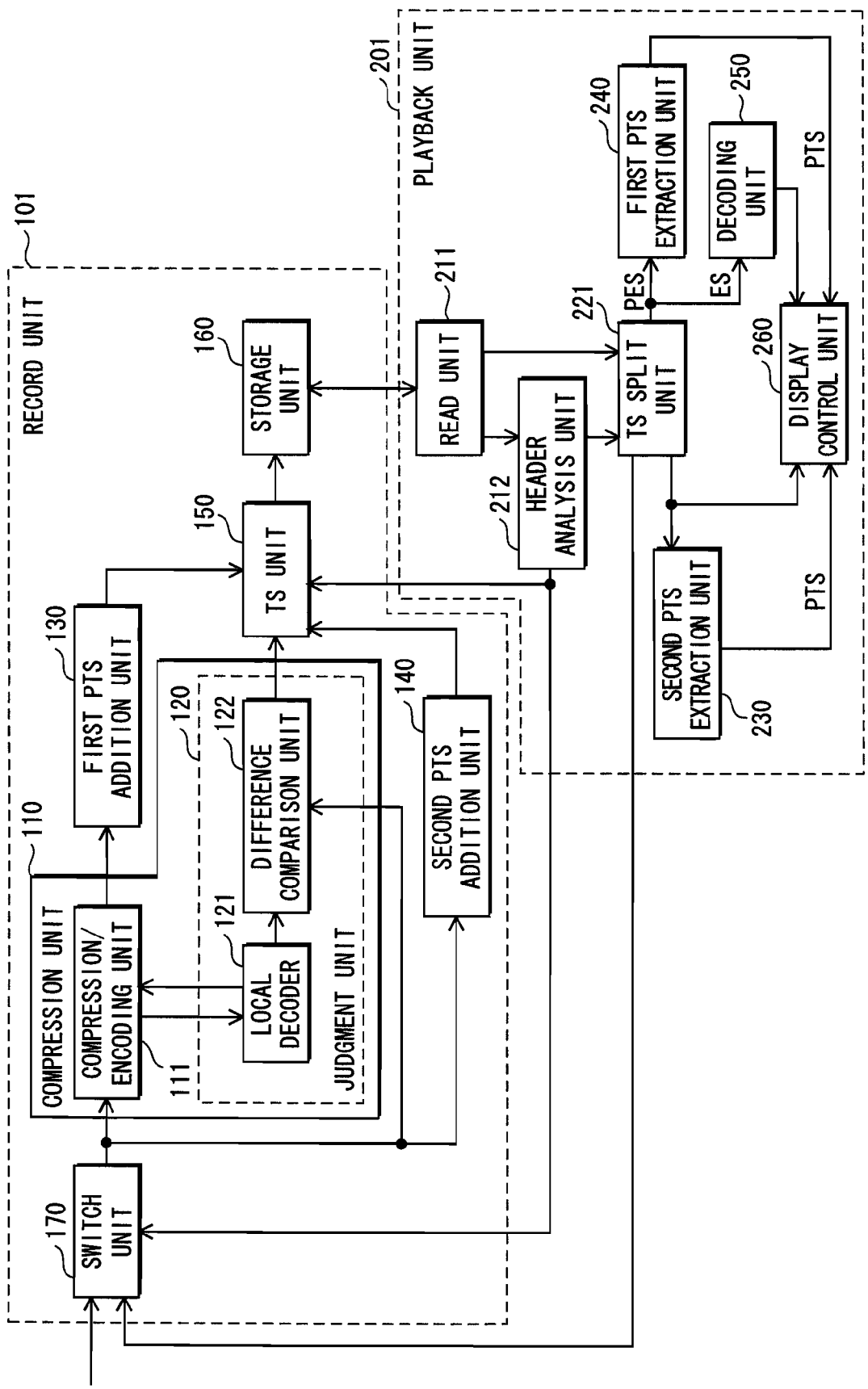
FIG. 11 shows functional blocks of a recording/playback apparatus pertaining to embodiment 2.

FIG. 11 shows a functional structure of the recording/playback apparatus of the present embodiment. The recording/playback apparatus includes a record unit 101 and a playback unit 201.

In the following description of the record unit 101 and the playback unit 201, the same reference notations have been given to constituent elements that are the same as in embodiment 1, and descriptions of such constituent elements have been omitted.

Playback Unit 201

The playback unit 201 shown in FIG. 11 has the structure described in embodiment 1, as well as includes a header analysis unit 212.

Here, the read unit 211 has the same functions described in embodiment 1, as well as receives a re-record instruction from the microcontroller (not depicted), reads the TS indicated by the TS identifier from the storage unit 160, and outputs the read TS to the header analysis unit 212.

The header analysis unit 212 receives the TS, and outputs TS packets included therein to the TS split unit 221 depending on the set value of the adapatation_field_control 33 of the TS packet header, and outputs, to a switch unit 170 of the record unit 101, an instruction to receive video data from the playback unit 201. Also, the header analysis unit 212 outputs, to the TS unit 150, information indicating TS packets that include uncompressed video data (hereinafter, referred to as "pre-compression TS packets"), and a re-record instruction to record regenerated TS packets in place of pre-compression TS packets.

The TS split unit 221 receives TS packets from the read unit 211 and the header analysis unit 212, and according to the output-origin of the TS packets, outputs the uncompressed video data and PTSs included in the TS packets to the record unit 101.

Record Unit 101

The record unit 101 shown in FIG. 11 has the structure described in embodiment 1, as well as includes the switch unit 170.

The switch unit 170 externally receives pre-compression digital video signals, and receives pre-compression digital video signals from the playback unit 201. The switch unit 170 also outputs the pre-compression video signals received from the playback unit 201 to the compression/encoding unit 111.

Upon receiving the aforementioned re-record instruction, the TS unit 150 records the regenerated TS packets in place of the pre-compression TS packets in the storage unit 160.

Operations

The following describes operations of the recording/playback apparatus pertaining to the present embodiment.

Figure 12:
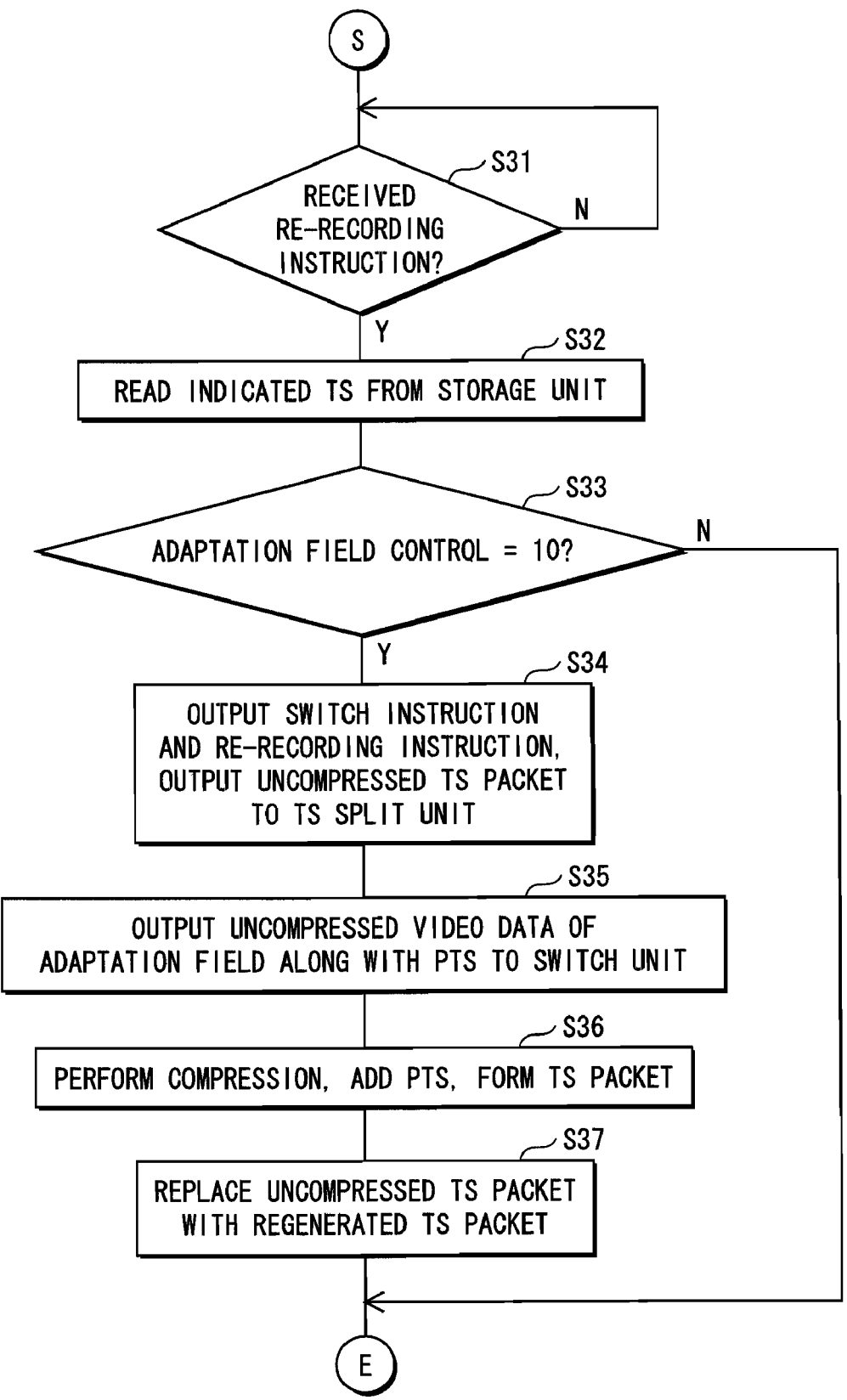
FIG. 12 is a flowchart showing re-recording processing pertaining to embodiment 2.

FIG. 12 is a flowchart showing re-recording processing performed by the recording/playback apparatus of the present embodiment. The following describes the re-recording processing with reference to FIG. 12. When the read unit 211 of the playback unit 201 receives a re-record instruction in step S31 (step S31:Y), the read unit 211 reads TS packets corresponding to the TS identifier specified in the re-record instruction from the storage unit 160 in accordance with ATSs of the TS packets, and outputs the read TS packets to the header analysis unit 212 (step S32).

Upon receiving the TS packets output in step S32, the header analysis unit 212 judges, for each TS packet, whether the value of adaptation_field_control 33 is set to "10" (step S33).

If the header analysis unit 212 judges in step S33 that the value of adaptation_field_control 33 of a TS packet is set to "10" (step S33:Y), the header analysis unit 212 outputs, to the switch unit 170 of the record unit 101, an input switch instruction to cause the switch unit 170 to receive the pre-compression digital video signal from the playback unit 201. The header analysis unit 212 also outputs the TS packets whose adaptation_field_control 33 is set to "10" to the TS split unit 221, and outputs, to the TS unit 150, information indicating the pre-compression TS packets and a re-record instruction for causing the TS unit 150 to record the regenerated TS packets in place of the pre-compression TS packets (step S34).

The TS split unit 221 receives the TS packet output in step S34, reads an uncompressed video data packet start code from non_enc_start_code_prefix 51 of the Non_encode_packet (FIG. 7) inserted in private_data_byte 38 (FIG. 4) of the adaptation field of the received TS packet, and successively outputs, to the switch unit 170, the luminance signals and color difference signals of the uncompressed video data packet as well as PTSs of the Non_encode_packet (step S35).

The switch unit 170 receives the pre-compression digital video signal including the luminance signals and color difference signals and the PTSs output from the TS split unit 221 in step S35, and outputs the received pre-compression digital video signal to the compression/encoding unit 111. Similarly to embodiment 1, the compression/encoding unit 111 compresses the luminance signals and color difference signals of the pre-compressed digital video signal frame by frame, and outputs the resulting compressed video data and PTSs to the first PTS addition unit 130. The first PTS addition unit 130 receives the compressed video data and PTSs output from the compression/encoding unit 111, adds the received PTSs to the compressed video data, generates PES packets in accordance with the PES packet structure shown in FIG. 5, and outputs the generated PES packets to the TS unit 150.

Similarly to embodiment 1, the TS unit 150 sets adaptation_field_control 33 of the received PES packets to "01", stores the resulting PES packets in data_byte 36 of TS packets (FIG. 3), thereby generating regenerated TS packets (step S36).

After step S36, the TS unit 150 records the regenerated TS packets of step S36 in the storage unit 160 in place of the pre-compression TS packets specified in step S34 (step S37).

As described above, if compression processing performance etc. deteriorates when a pre-compression digital video signal is first received, a TS including uncompressed video data is temporarily recorded to the recording medium, and the above-described re-record processing is performed after the compression processing performance has been recovered, thereby reducing the size of the uncompressed video data down to the size of compressed video data, and effectively utilizing the recording medium.

Supplementary Remarks

Note that although described based on the above embodiments, the present invention is of course not limited to these embodiments. The present invention also includes the following cases.

(1) In embodiment 1, the compression/encoding unit 111 receives and compresses an uncompressed digital video signal, and judges whether compression processing performance has deteriorated by comparing the uncompressed digital video data and compressed video data that has been decoded by the local decoder 121. However, whether to record compressed data or uncompressed data may be judged before the compression/encoding unit 111 performs compression.

In this case, if for example the compression/encoding unit 110 receives a predetermined number of compression/recording requests or more, the compression unit 110 stops compression processing, and instructs the TS unit 150 to select uncompressed video data output from the second PTS addition unit 140.

The compression/encoding unit 111 stops performing compression processing until the number of compression processing requests falls below the predetermined number.

Until the instruction from the compression/encoding unit 111 is cancelled, the TS unit 150 acquires the uncompressed video data, converts the acquired uncompressed video data to TS packets, and records the TS packets to the storage unit 160.

(2) Also, in embodiment 1, the TS unit 150 selects video data from the first PTS addition unit 130 or second PTS addition unit 140 according to whether the image quality of the compressed video data is greater than or equal to the predetermined reference image quality. However, the TS unit 150 may select video from the first PTS addition unit 130 or second PTS addition unit 140 according to whether an output time interval of compressed video data output from the compression/encoding unit 111 has exceeded a predetermined time period such as 1/30 sec.

According to this structure, if the compression/encoding unit 111 cannot complete the frame-by-frame compression processing within the predetermined time period, compression processing performance is judged to have deteriorated due to, for example, recording processing being performed on other video content.

(3) In the above embodiments, the TS unit 150 stores a predetermined amount of uncompressed video data output from the second PTS addition unit 140 in Private_data_byte field 38 (FIG. 4) of the adaptation field of a TS packet. However, the predetermined amount of uncompressed video data may be stored in PES_private_data field 44 (FIG. 6) of a PES packet.

(4) Also, although the recorded uncompressed video data is expressed as luminance signals and color difference signals in the above embodiments, the recorded uncompressed video data may be expressed as RGB values.

(5) Also, TS packets are given ATSs and recorded to the storage unit 160 in the above embodiments, and additionally, read-time information that indicates the reception order and reception time interval of the TS packets may be stored along with the TS packets.

(6) In the above embodiments, the recording/playback apparatus includes a record unit and a playback unit, the record unit records video content as a TS, the playback unit reads the TS in order to perform playback thereof, and re-recording processing is performed by the record unit. However, the record unit may read the TS and perform re-recording processing.

(7) Also, although compressed and uncompressed video data is recorded in the TS format of the MPEG-2 system in the above embodiments, another format may be used, provided that time information is added to both the compressed and uncompressed video data, and distinguishing between the compressed and uncompressed video is possible.

(8) The present invention may be realized as methods including the steps described in the above embodiments. Also, the present invention may be realized as a computer program for causing a computer to operate by the methods. Also, the present invention may be realized as digital signals representing the computer program.

The present invention may be realized as a computer-readable recording medium (for example, a flexible disk, a hard disk, CD, MO, DVD, DVD, BD (Blue-ray Disc), or a semiconductor memory) containing the above computer program or digital signals recorded thereon.

The computer program or the digital signals as the present invention may be transferred via telecommunication lines, radio communications, communication lines, or a network such as the Internet.

Also, the computer program or the digital signals as the present invention may be transferred to another computer system by means of the computer-readable recording medium recording them, the network or the like so that the other computer system can operate in the same manner.

Industrial Applicability

A recording/playback apparatus of the present invention can be used in, for example, a hard disk recorder etc. that performs recording/playback of a plurality of video contents in parallel, and a home server etc. that receives video content from a plurality of terminals via a home network and performs compression/encoding on the received video content.

The invention claimed is:

1. A recording apparatus that receives an uncompressed digital video signal and records video data to a recording medium using the received uncompressed digital video signal, the recording apparatus comprising:
  a compression unit operable to compress the uncompressed digital video signal frame-by-frame to generate compressed video data;
  a record unit operable to, in accordance with a predetermined selection method for selecting which of the compressed video data and uncompressed video data of the uncompressed digital video signal to record, successively (i) select a piece of the compressed video data or the uncompressed video data, (ii) add time information to a predetermined unit of the selected piece of video data to indicate a display timing of the selected piece of video data, and (iii) record the selected piece of video data to the recording medium such that whether the selected piece of video data is compressed or uncompressed is identifiable; and
  a judgment unit operable to, with use of the compressed video data and the uncompressed video data, judge frame-by-frame whether the compression unit has performed the compression of the uncompressed digital video signal such that an image quality of the compressed video data is greater than or equal to a predetermined reference image quality,
  wherein the predetermined selection method is a method for selecting (i) to record a piece of the compressed video data when the judgment unit judges affirmatively, and (ii) to record a piece of the uncompressed video data when the judgment unit judges negatively, and
  wherein the record unit selects the piece of the compressed video data or the piece of the uncompressed video data, adds the time information to the predetermined unit of the selected piece of video data to indicate the display timing of the selected piece of video data, and records the selected piece of video data to the recording medium in a transport stream format such that whether the selected piece of video data is compressed or uncompressed is identifiable.

2. The recording apparatus of claim 1, wherein the judgment unit performs the judgment by (i) decoding the compressed video data frame-by-frame to generate decoded video data, (ii) calculating differences between pixel values of the decoded video data and corresponding pixel values of the uncompressed video data, (iii) judging that the image quality of the decoded video data is greater than or equal to the predetermined reference image quality when a total of the calculated differences is greater than or equal to a predetermined threshold, and (iv) judging that the image quality of the decoded video data is less than the predetermined reference image quality when the total of the calculated differences is less than the predetermined threshold.

3. The recording apparatus of claim 1,
  wherein the record unit is further operable to set an adaptation field control value, such that whether the selected piece of video data is compressed or uncompressed is identifiable, and
  wherein the record unit records the selected piece of video data to the recording medium as a transport stream packet, the transport stream packet not including an adaptation field when the selected piece of video data is compressed, and the selected piece of video data being stored in the adaptation field of the transport stream packet when the selected piece of video data is uncompressed.

4. The recording apparatus of claim 1, further comprising:
  a re-compression/record control unit operable to (i) read a piece of the video data that has been recorded to the recording medium, (ii) judge whether the piece of video data read by the re-compression/record control unit is compressed or uncompressed, and (iii) when the piece of video data read by the re-compression/record control unit is judged to be uncompressed, cause the compression unit to compress the piece of video data read by the re-compression/record control unit to generate a new piece of compressed video data, and cause the record unit to add the time information of the piece of video data read by the re-compression/record control unit to the new piece of compressed video data and record the new piece of compressed video data the recording medium in place of the piece of video data read by the re-compression/record control unit and judged to be uncompressed.

5. A playback apparatus that plays back video data which has been recorded to a recording medium by the recording apparatus of claim 1, the playback apparatus comprising:
  a first judgment unit operable to read a piece of the video data, the read piece of video data being of a predetermined size, and to judge whether the read piece of video data is compressed or uncompressed;
  a first extraction unit operable to, when the first judgment unit judges that the read piece of video data is compressed, decode the read piece of video data and extract the time information that has been added to the piece of decoded video data;
  a second extraction unit operable to, when the first judgment unit judges that the read piece of video data is uncompressed, extract the time information that has been added to the read piece of video data; and
  an output unit operable to output the piece of decoded video data in accordance with a timing indicated by the time information extracted by the first extraction unit, and to output the piece of video data judged to be uncompressed in accordance with a timing indicated by the time information extracted by the second extraction unit.

6. A recording/playback system that receives an uncompressed digital video signal, records video data to a recording medium using the received uncompressed digital video signal, and plays back the recorded video data, the recording/playback system comprising:
- a compression unit operable to compress the uncompressed digital video signal frame-by-frame to generate compressed video data;
- a record unit operable to, in accordance with a predetermined selection method for selecting which of the compressed video data and uncompressed video data of the uncompressed digital video signal to record, successively (i) select a piece of the compressed video data or the uncompressed video data, (ii) add time information to a predetermined unit of the selected piece of video data to indicate a display timing of the selected piece of video data, and (iii) record the selected piece of video data to the recording medium such that whether the selected piece of video data is compressed or uncompressed is identifiable;
- a first judgment unit operable to read a piece of the video data recorded by the recording unit, the read piece of video data being of a predetermined size, and to judge whether the read piece of video data is compressed or uncompressed;
- a first extraction unit operable to, when the first judgment unit judges that the read piece of video data is compressed, decode the read piece of video data and extract the time information that has been added to the piece of decoded video data;
- a second extraction unit operable to, when the first judgment unit judges that the read piece of video data is uncompressed, extract the time information that has been added to the read piece of video data;
- an output unit operable to output the piece of decoded video data in accordance with a timing indicated by the time information extracted by the first extraction unit, and to output the piece of video data judged to be uncompressed in accordance with a timing indicated by the time information extracted by the second extraction unit; and
- a second judgment unit operable to, with use of the compressed video data and the uncompressed video data, judge frame-by-frame whether the compression unit has performed the compression of the uncompressed digital video signal such that an image quality of the compressed video data is greater than or equal to a predetermined reference image quality,
- wherein the predetermined selection method is a method for selecting (i) to record a piece of the compressed video data when the second judgment unit judges affirmatively, and (ii) to record a piece of the uncompressed video data when the second judgment unit judges negatively, and
- wherein the record unit selects the piece of the compressed video data or the piece of the uncompressed video data, adds the time information to the predetermined unit of the selected piece of video data to indicate the display timing of the selected piece of video data, and records the selected piece of video data to the recording medium in a transport stream format such that whether the selected piece of video data is compressed or uncompressed is identifiable.

7. An integrated circuit for a recording/playback apparatus that receives an uncompressed digital video signal, records video data to a recording medium using the received uncompressed digital video signal, and plays back the recorded video data, the integrated circuit comprising:
- a compression unit operable to compress the uncompressed digital video signal frame-by-frame to generate compressed video data;
- a record unit operable to, in accordance with a predetermined selection method for selecting which of the compressed video data and uncompressed video data of the uncompressed digital video signal to record, successively (i) select a piece of the compressed video data or the uncompressed video data, (ii) add time information to a predetermined unit of the selected piece of video data to indicate a display timing of the selected piece of video data, and (iii) record the selected piece of video data to the recording medium such that whether the selected piece of video data is compressed or uncompressed is identifiable;
- a first judgment unit operable to read a piece of the video data recorded by the recording unit, the read piece of video data being of a predetermined size, and to judge whether the read piece of video data is compressed or uncompressed;
- a first extraction unit operable to, when the first judgment unit judges that the read piece of video data is compressed, decode the read piece of video data and extract the time information that has been added to the piece of decoded video data;
- a second extraction unit operable to, when the first judgment unit judges that the read piece of video data is uncompressed, extract the time information that has been added to the read piece of video data;
- an output unit operable to output the piece of decoded video data in accordance with a timing indicated by the time information extracted by the first extraction unit, and to output the piece of video data judged to be uncompressed in accordance with a timing indicated by the time information extracted by the second extraction unit, and
- a second judgment unit operable to, with use of the compressed video data and the uncompressed video data, judge frame-by-frame whether the compression unit has performed the compression of the uncompressed digital video signal such that an image quality of the compressed video data is greater than or equal to a predetermined reference image quality,
- wherein the predetermined selection method is a method for selecting (i) to record a piece of the compressed video data when the second judgment unit judges affirmatively, and (ii) to record a piece of the uncompressed video data when the second judgment unit judges negatively, and
- wherein the record unit selects the piece of the compressed video data or the piece of the uncompressed video data, adds the time information to the predetermined unit of the selected piece of video data to indicate the display timing selected piece of video data, and records the selected piece of video data to the recording medium in a transport stream format such that whether the selected piece of video data is compressed or uncompressed is identifiable.

* * * * *